United States Patent [19]
Ohzawa et al.

[11] Patent Number: 5,993,010
[45] Date of Patent: Nov. 30, 1999

[54] TWO-DIMENSIONAL ILLUMINATION OPTICAL SYSTEM AND LIQUID CRYSTAL PROJECTOR USING SAME

[75] Inventors: Soh Ohzawa, Toyonaka; Katsuhiro Takamoto, Sakai, both of Japan

[73] Assignee: Minolta Co., Ltd., Osaka, Japan

[21] Appl. No.: 09/119,953

[22] Filed: Jul. 21, 1998

[30] Foreign Application Priority Data

Aug. 5, 1997 [JP] Japan .................. H9-210920

[51] Int. Cl.⁶ .................................. G03B 21/14
[52] U.S. Cl. ................. 353/99; 353/31; 362/298
[58] Field of Search .................. 353/38, 31, 34, 353/37, 98, 99; 362/297, 298, 299, 309, 346, 328, 347

[56] References Cited

U.S. PATENT DOCUMENTS

| 5,379,080 | 1/1995 | Onozuka | 353/99 |
| 5,418,583 | 5/1995 | Masumoto | 353/38 |
| 5,613,768 | 3/1997 | Kim | 362/346 |
| 5,647,664 | 7/1997 | Hanecka | 362/346 |
| 5,662,401 | 9/1997 | Shimizu et al. | 353/38 |
| 5,755,503 | 5/1998 | Chen et al. | 353/99 |
| 5,861,991 | 1/1999 | Fork | 359/618 |

FOREIGN PATENT DOCUMENTS 6-265887  9/1994  Japan .
7-120753  5/1995  Japan .

Primary Examiner—William Dowling
Attorney, Agent, or Firm—Sidley & Austin

[57] ABSTRACT

An illumination optical system has a light source unit, a first array having a plurality of two-dimensionally arranged cells which deflect a incident light from the light source unit and a second array having a plurality of cells two-dimensionally arranged in a vicinity of a focal plane of the first array, wherein at least one of the first array and the second array is formed as a reflection array.

14 Claims, 7 Drawing Sheets

TWO-DIMENSIONAL ILLUMINATION OPTICAL SYSTEM AND LIQUID CRYSTAL PROJECTOR USING SAME

This application is based on the application No. 9-210920 filed in Japan, the contents of which is hereby incorporated by reference.

FIELD OF THE INVENTION

The present invention relates to a two-dimensional illumination optical system for uniformly illuminating a surface to be illuminated, and a liquid crystal projector using the same.

DESCRIPTION OF THE RELATED ART

Generally, light emitted from a light source is nonuniform in intensity distribution. Therefore, applying the light as is to a surface to be illuminated results in nonuniform illumination.

When it is necessary to uniformly illuminate a surface, conventionally, a two-dimensional illumination optical system as shown in FIG. 14 has been used. In this optical system, a light source unit 3, and first and second transmission arrays 19 and 29 are disposed in a line. In the arrays 19 and 29, a plurality of lenses 190 and 290 are two-dimensionally arranged. In the two-dimensional illumination optical system, the light exiting from the light source unit 3 is divided into a plurality of luminous fluxes by the first array 19 and a secondary light source 194 is formed in each of the lenses 290 constituting the second transmission array 29. Then, the lenses 290 apply the luminous fluxes exiting from the secondary light sources 194 to the entire surface of a surface 4 to be illuminated. Since the surface 4 is illuminated by thus superposing the luminous fluxes from the secondary light sources 194 on the surface 4, the surface 4 is uniformly illuminated.

However, in this two-dimensional illumination optical system, since two transmission arrays 19 and 29 are used, it is necessary that the light source unit 3, the first array 19, the second array 29 and the surface 4 to be illuminated be placed in a line. Consequently, the total length increases, so that a large space is necessary for the illumination optical system.

To solve this problem, it has been proposed to reduce the size by bending the optical path by inserting a plane mirror in a given position on the optical path from the light source unit 3 to the surface 4, for example, between the first array 19 and the second array 29. However, to form a two-dimensional illumination optical system in such a manner, a plane mirror is necessarily added as a new element, so that the cost and the weight of the optical system increase in accordance with the addition of the new element.

SUMMARY OF THE INVENTION

An object of the present invention is to provide an improved illumination optical system.

Another object of the present invention is to provide a compact and lightweight two-dimensional illumination optical system.

A yet another object of the present invention is to provide a two-dimensional illumination optical system capable of uniformly illuminating a surface to be illuminated.

A still another object of the present invention is to provide a simple-structure and low-cost two-dimensional illumination optical system.

The above-mentioned objects are achieved by an illumination optical system comprising:

a light source unit;

a first array having a plurality of two-dimensionally arranged cells which deflect a incident light from the light source unit; and a second array having a plurality of cells two-dimensionally arranged in a vicinity of a focal plane of the first array, wherein at least one of the first array and the second array is formed as a reflection array.

The invention itself, together with further objects and attendant advantages, will be understood by reference to the following detailed description taken in conjunction with the accompanies drawings.

BRIEF DESCRIPTION OF THE DRAWINGS

In the following description, like parts are designed by like reference numbers throughout the several drawings.

DETAILED DESCRIPTION OF THE PREFERRED EMBODIMENTS

Figure 1:
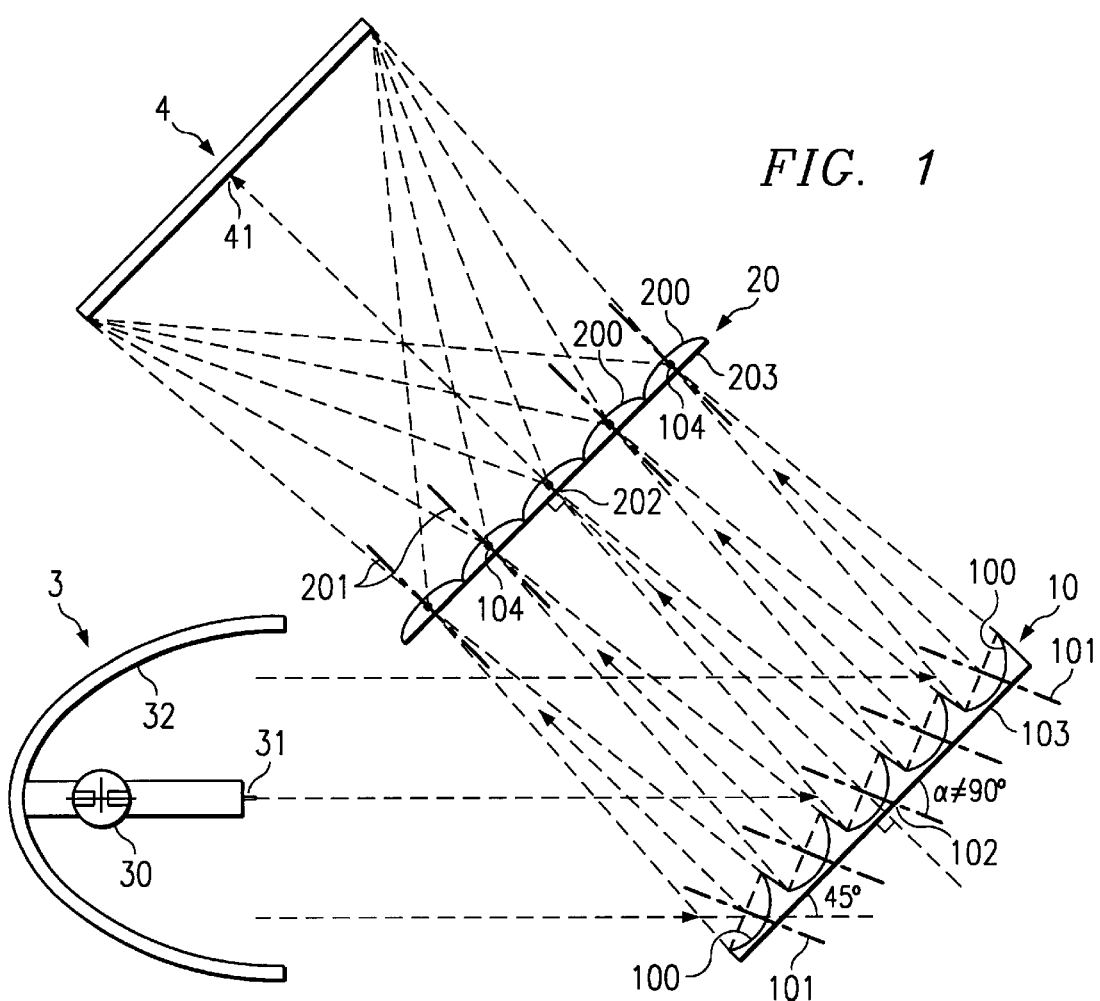
FIG. 1 is a structural view showing a first embodiment of the two-dimensional illumination optical system according to the present invention.

FIG. 1 is a structural view showing a first embodiment of the two-dimensional illumination optical system according to the present invention. This two-dimensional illumination optical system comprises a light source unit 3, a first array 10 formed as a reflection array, and a second array 20 formed as a transmission array. These elements are placed so that the light exiting from the light source unit 3 is reflected at the first array 10, is transmitted by the second array 20 and then uniformly illuminates a surface 4 to be illuminated. The structures of these elements will be described.

In the light source unit 3, a light source 30 comprising a metal halide lamp that emits white light of random polarization is disposed in one focal position of a parabolic mirror 32. Part of the luminous flux from the light source 30 directly exits through the opening (right side of the figure) of the parabolic mirror 32, and the remaining part of the luminous flux exits therethrough after being reflected off of the reflecting surface of the parabolic mirror 32. Thus, the luminous flux exiting from the light source unit 3 is a substantially parallel beam.

On the opening side of the parabolic mirror 32, the first array 10 comprising a plurality of reflection mirrors 100 having the same optical power and being two-dimensionally arranged in one plane is placed so that the light from the light source unit center 31 is incident on the center 102 of the first array 10. Since the first array 10 is placed so that a plane 103 where the reflection mirrors 100 constituting the first array 10 are arranged (hereinafter, the plane 103 will be referred to as "reference plane") tilts at 45 degrees with respect to the direction of the light exiting from the light source unit 3 (the horizontal direction of the figure), the light exiting from the light source unit 3 is obliquely incident on the first array 10.

The reflection mirrors 100 constituting the first array 10 each comprise a concave reflecting mirror of a decentered configuration with the optical axis 101 tilting with respect to the reference plane 103 of the first array 10. Since the reflection mirrors 100 have the decentered configuration, the light exiting from the light source unit 3 and incident on the first array 10 is incident on and exits from the reference plane 103 at different angles, so that the light exits in a direction depending on the decentering angle of the reflection mirrors 100. In this embodiment, the decentering angle of the reflection lenses is set so that the light incident on the reference plane of the first array 10 at 45 degrees exits in a direction vertical to the reference plane 103 (leftwardly and obliquely ascending direction of the figure).

Consequently, the light exiting from the light source unit 3 and incident on the first array 10 is divided into a plurality of luminous fluxes by the reflection mirrors 100 constituting the array 10, and exits vertically to the reference plane 103 of the first array 10. Since the reflection mirrors 100 have the same optical power, the luminous fluxes exiting from the mirrors 100 converge in one plane that is parallel to and a predetermined distance away from the reference plane 103 of the first array 10 to form a plurality of secondary light sources 104.

The plane where the secondary light sources 104 are formed is a focal plane including the focal positions of the reflection mirrors 100 of the first array 10. In the plane, the second array 20 with the plane as its reference plane 203 is disposed. In the second array 20, a plurality of transmission lenses 200 corresponding to the reflection mirrors 100 constituting the first array 10 are two-dimensionally arranged in the reference plane 203. The second array 20 is placed so that the light exiting from the center 102 of the first array 10 is incident on the center 202 of the second array 20. On the exit surface side of the second array 20, the surface 4 to be illuminated is placed so as to be parallel to the reference plane 203 of the second array 20 and so that the ray exiting from the center 202 of the second array 20 is vertically incident on the center 41 thereof.

The first array 10 and the second array 20 comprise a plurality of mirrors 100 and lenses 200, respectively, and there are cases where no mirrors 100 and lenses 200 have the optical axis thereof at the geometric centers of the arrays 10 and 20. In this specification, in such a case, assuming that one mirror 100 and lens 200 have the optical axes thereof at the geometric centers of the arrays 10 and 20, the principal ray passing through this mirror 100 and lens 200 is treated as a ray incident on the array centers 102 and 202 or exiting from the array centers 102 and 202.

The transmission lenses 200 constituting the second array 20 are formed so that the luminous fluxes from the secondary light sources 104 formed in the transmission lenses 200 are applied to the entire surface of the surface 4 to be illuminated. Consequently, on the surface 4, the luminous fluxes from the light sources 104 are superposed over the entire surface, so that the surface 4 is uniformly illuminated.

Since the luminous fluxes from the transmission lenses 200 constituting the second array 20 are thus applied to the entire surface of the surface 4, the distance to the center 41 of the surface 4 slightly differs among the transmission lenses 200. However, since the surface 4 is placed parallel to the reference plane 203 of the second array 20, the optical lengths from the transmission lenses 200 to the center 41 of the surface 4 are substantially the same. The optical powers of the transmission lenses 200 are substantially the same. Moreover, the direction to the center 41 of the surface 4 slightly differs among the transmission lenses 200. However, since the surface 4 is placed so that the ray exiting from the center 202 of the second array 20 is vertically incident on the center 41 of the surface 4, the transmission lens 200 at the center 202 of the second array 20 is not decentered. The decentering angles of the transmission lenses 200 are set so as to increase with distance from the center 202 and to be distributed symmetrically with respect to the center 202 of the second array 20.

Since the plurality of luminous fluxes divided by the first array 10 are superposed on the surface 4 by the second array 20 thus structured, uniform illumination of the surface 4 is realized.

According to the two-dimensional illumination optical system of the first embodiment, since the first array 10 is formed as a reflection array, the optical path from the light source unit 3 to the surface 4 to be illuminated is bent at the first array 10, so that the total length of the two-dimensional illumination optical system is reduced. As a result, the overall size is reduced. In addition, since it is unnecessary to add an optical element other than a array (for example, a plane mirror) between the light source unit and the surface to be illuminated like in the conventionally proposed example, a compact and lightweight two-dimensional illumination optical system can be provided at low cost.

Further, according to this embodiment, since the reflection mirrors 100 of the first array 10 formed as a reflection array have the same optical power and the same decentering angle, they are easy to design and manufacture.

The reflection mirrors 100 constituting the first array 10 can have the same optical power for the following reasons: since the light from the light source unit 3 is a substantially parallel beam, the light source unit 3 can be regarded as situated at infinity and the optical path lengths from the reflection mirrors 100 to the light source unit 3 can be regarded as the same infinite length; and since the first array 10 and the second array 20 are placed so that the reference surfaces 103 and 203 thereof are parallel to each other, the optical path lengths from the reflection lenses 100 of the first array 10 to the second array 20 converging the luminous fluxes from the mirrors 100 to form the secondary light sources 104 are the same.

In this embodiment, the first array 10 is placed so as to tilt with respect to the direction of the light exiting from the light source unit 3. However, since the light exiting from the light source unit 3 is a substantially parallel beam, the array 10 can be constituted by a plurality of reflection mirrors 100 that divide the first array 10 so as to be symmetrical with respect to the center 102 of the first array 10. This makes the first array 10 easier to design and manufacture.

The first array 10 can be structured in this manner because in this embodiment, the intensity distribution of the light exiting from the light source unit 3 and incident on the first array 10 is symmetrical with respect to the center 102 of the first array 10. That is, since this two-dimensional illumination optical system achieves uniform illumination of the surface 4 by suppressing the influence of the light intensity nonuniformity by superposing the luminous fluxes divided by the first array 10, if the intensity distribution of the light incident on the first array 10 is symmetrical with respect to the center 102 of the first array 10, it is possible for the first array 10 to divide the luminous flux symmetrically with respect to the center 102 of the first array 10.

Figure 2A:
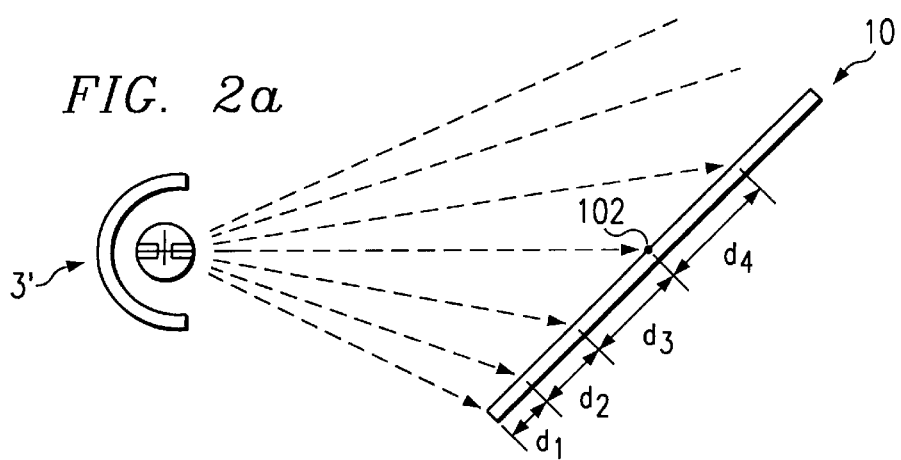
FIGS. 2(a) and 2(b) are views of assistance in explaining the intensity distribution of light incident on a array placed obliquely to light from the center of a light source.
Figure 2B:
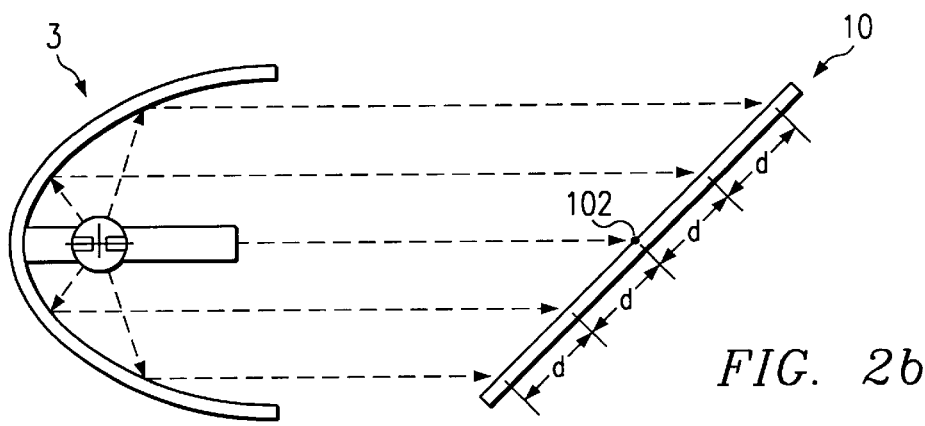

The intensity distribution of the light incident on the first array 10 placed obliquely to the light from the light source units 3 and 3' is symmetrical with respect to the center 102 of the first array 10 for the following reason: when diffused light is incident, as shown in FIG. 2(a), the density of the incident luminous fluxes is lower on the upper right part of the figure of the first array 10 than on the lower left part of the figure; however, when a substantially parallel beam is incident, as shown in FIG. 2(b), the same number of luminous fluxes are incident on the upper right part and on the lower left part of the figure.

In correspondence with the first array 10 comprising the plurality of reflection mirrors 100 that divide the first array 10 symmetrically with respect to the center 102 of the first array 10, the plurality of transmission lenses 200 of the second array 20 corresponding to the reflection mirrors 100 of the first array 10 can be formed as dividing the second array 20 symmetrically with respect to the center 202 of the second array 20. In addition, as described above, the transmission lenses 200 of the second array 20 have substantially the same optical power and are distributed symmetrically with respect to the array center 202. As a result, the transmission lenses 200 are easy to design and manufacture.

When light is obliquely incident on or obliquely exits from the arrays 10 and 20, astigmatism is generated. However, in this embodiment, since the first array 10 on which the light from the light source unit 3 is obliquely incident is constituted by the reflection mirrors 100 having the decentered configuration, the astigmatism can be corrected by forming the lenses 10 so that the aberration generated due to the decentered configuration cancels the astigmatism. Therefore, the use of the reflection array cancels the astigmatism inevitably generated due to the oblique incidence or exit of the light, and improves the condensing state of the luminous fluxes emitted therefrom. As a result, the uniformity of illumination of the surface 4 is further improved.

While the reflection mirrors 100 of the first array 10 formed as a reflection array are concave reflecting mirrors in this embodiment, they are not limited to concave reflecting mirrors but may be optical glass lenses one surfaces of which are totally reflecting surfaces.

Figure 3:
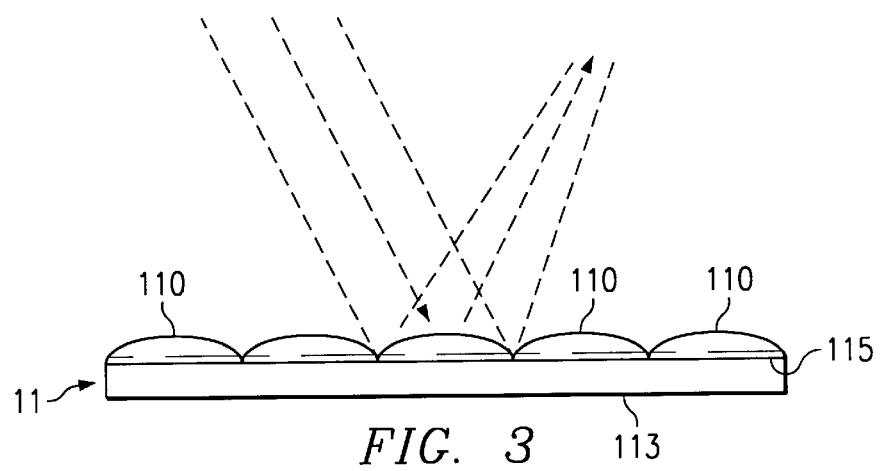
FIG. 3 is a structural view of a reflection array using plano-convex lenses.

For example, the first array may be a reflection array 11 as shown in FIG. 3. In the array 11, a plurality of optical glass plano-convex lenses 110 one surfaces of which are plane and the other surfaces of which are convex are arranged so that their rims adjoin each other, and a totally reflecting surface 115 is provided on the plane surfaces of the lenses 110. In this array, the plano-convex lenses 110 and a part of the totally reflecting surface 115 being in contact with the plane surfaces of the lenses 110 correspond to the concave reflecting mirrors (reflection lenses 100) in the above-described embodiment (FIG. 1).

In the reflection array 11 of such a structure, the incident light is divided into a plurality of luminous fluxes at each lens 110, and the luminous fluxes are made convergent by the condensing action of the lenses 110 and exits after reflected by the totally reflecting surfaces 115. As a result, similar effects are obtained to those obtained when concave reflecting mirrors are used (FIG. 1).

Figure 4:
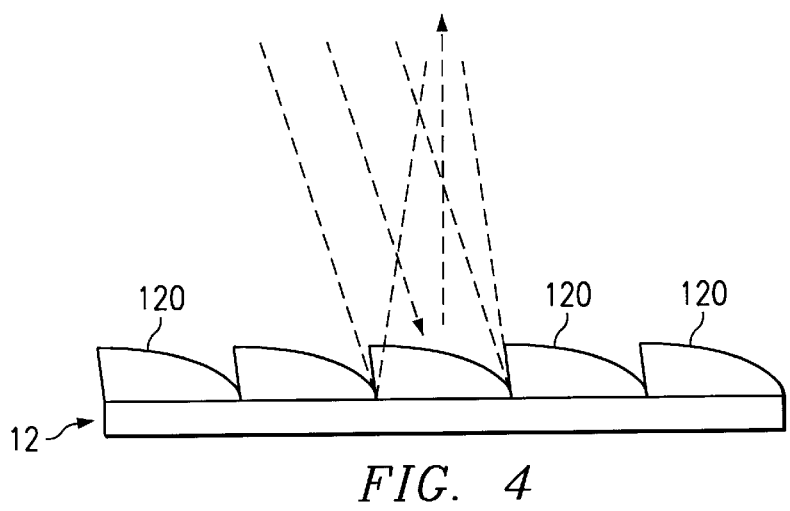
FIG. 4 is a structural view of a reflection array using lenses of a decentered configuration.
Figure 5:
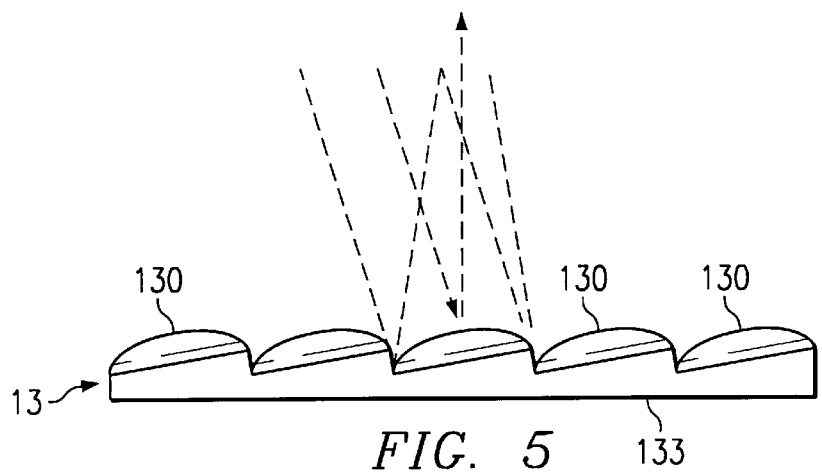
FIG. 5 is a structural view of a reflection array using lenses of a decentered configuration.

Such optical glass lenses can also be provided with a decentered configuration by forming them as shown in FIG. 4 or 5. In FIG. 4, the convex surfaces of lenses 120 are asymmetrical. In FIG. 5, lenses 130 are arranged so that the plane surfaces thereof are oblique to a reference surface 133 of an array 13. With respect to the effect of decentered configurations that the astigmatism due to oblique incidence can be corrected, when the lenses are provided with such decentering configurations, the degree of lens design freedom is higher than when concave reflecting mirrors are used (FIG. 1) because the material for the lenses 120 and 130 can be appropriately selected, so that a higher effect is obtained.

Figure 6:
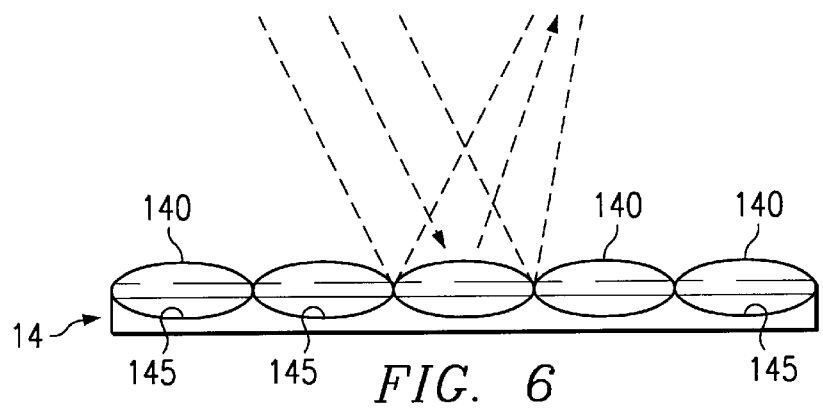
FIG. 6 is a structural view of a reflection array using lenses both side surfaces of which have a lens configuration.

Moreover, the first array may be a reflection array 14 as shown in FIG. 6. In the array 14, lenses 140 both side surfaces of which have a lens configuration and one of the surfaces of which are totally reflecting surfaces 145 are used as the optical glass lenses. With this structure, the lens configuration on the side of the totally reflecting surface 145 can also be adjusted for the correction of the astigmatism due to oblique incidence, so that a particularly high effect can be obtained.

The curved surfaces of the concave reflecting mirrors and the optical glass lenses may be spherical because spherical surfaces are easy to design and manufacture. However, in order to improve the degree of lens design freedom in consideration of the correction of the astigmatism due to oblique incidence, it is desired for the curved surfaces to be free curved surfaces so that the lenses each have an asymmetrical optical power with respect to the optical axis.

Figure 7:
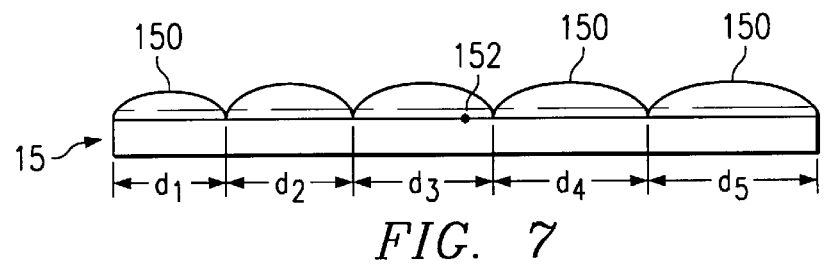
FIG. 7 is a structural view of a reflection array comprising lenses dividing the array asymmetrically with respect to the center of the array.

In this embodiment, since the first array 10 is formed on the assumption that the light from the light source unit 2 is a substantially parallel beam, the mirrors 100 are arranged so that the luminous flux is divided symmetrically with respect to the center 102 of the first array 10. However, when the light from the light source unit 3 is incident in an asymmetrical state with respect to the center 102 of the first array 10, it is desired that, as shown in FIG. 7, reflection lenses 150 constituting a first array 150 have different sizes and be arranged asymmetrical with respect to the center 152 of the array 15.

Figure 8:
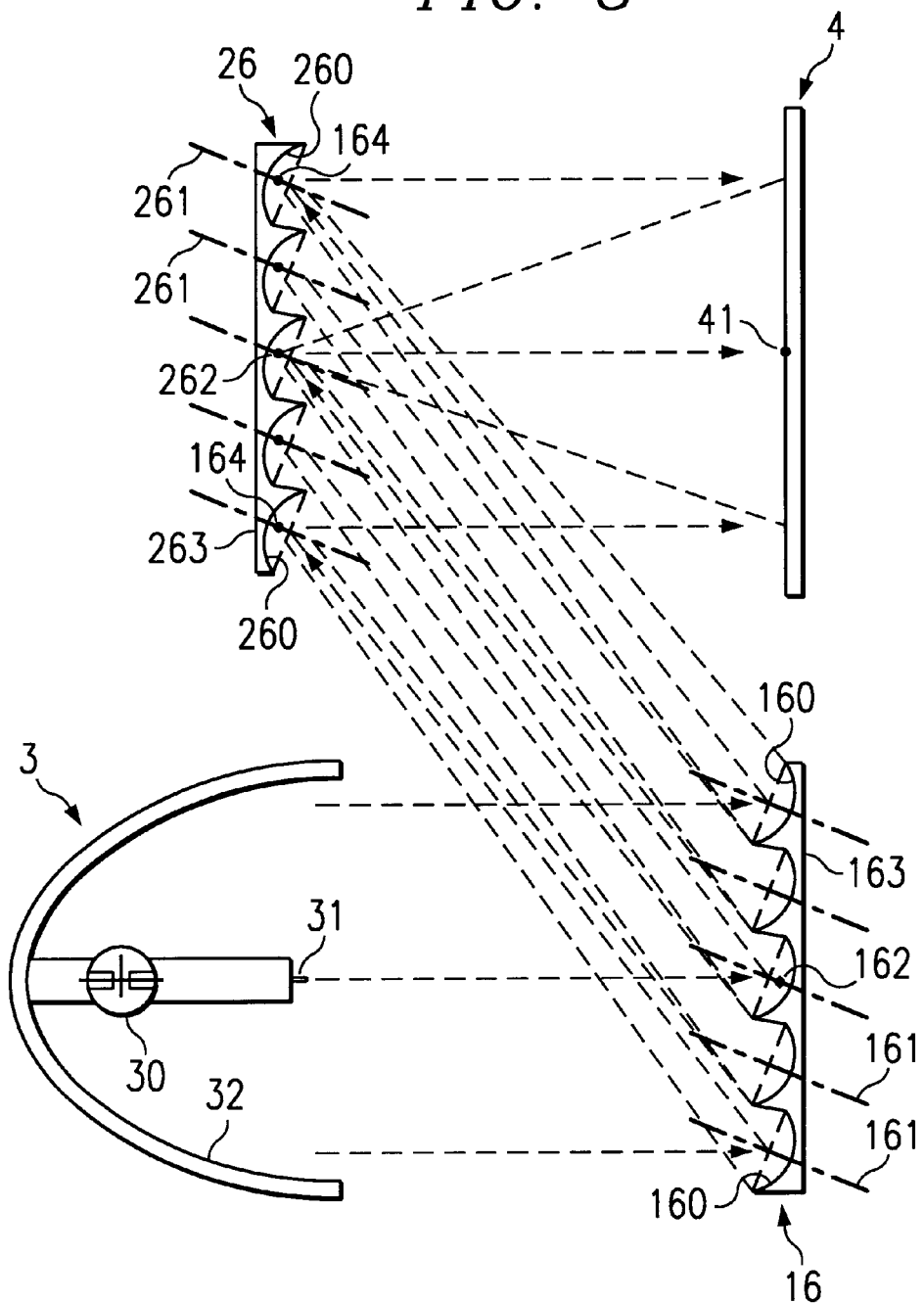
FIG. 8 is a structural view showing a second embodiment of the two-dimensional illumination optical system according to the present invention.

FIG. 8 is a structural view showing a second embodiment of the two-dimensional illumination optical system according to the present invention. This two-dimensional illumination optical system comprises the light source unit 3 and first and second arrays 16 and 26 both formed as reflection arrays. Hereinafter, elements the same as those of the first embodiment are designated by the same reference numbers and will not be described again. In the light source unit 3, the parabolic mirror 32 in which the light source 30 is provided in one focal position is disposed with the opening side being on the right side of the figure. The luminous flux of random polarization from the light source 30 exits through the opening directly, and together with the light reflected at the parabolic mirror 32, as a substantially parallel beam.

On the opening side, the first array 16 is placed so that the ray emitted from the center 31 of the light source unit 3 is incident on the center 162 of the first array 16 vertically to a reference plane 163 of the first array 16. The first array 16 comprises a plurality of reflection lenses 160 two-dimensionally arranged in the reference plane 163. The reflection mirrors 160 each comprise a concave reflecting mirror of a decentered configuration with the optical axis 161 tilting with respect to the reference plane 163.

Consequently, the luminous flux exiting from the light source unit 3 to be incident on the first array 16 is incident vertically to the reference plane 163 of the first array 16. Since the reflection lenses 160 constituting the first array 16 are decentered, the luminous flux exits in a direction oblique to the reference plane 163 (leftwardly and obliquely ascending direction of the figure). The exiting luminous flux is divided into a plurality of luminous fluxes by the reflection mirrors 160 constituting the first array 16. The divided luminous fluxes converge in one plane parallel to the reference plane 163 of the first array 16 to form a plurality of secondary light sources 164.

The plane where the secondary light sources 164 are formed is parallel to the reference plane 163 of the first array 16. However, since the reflection mirriors 160 constituting the first array 16 are decentered, the secondary light sources 164 are situated in the leftwardly and obliquely ascending direction of the figure with respect to the first array 16. The second array 26 comprising a plurality of two-dimensionally arranged reflection mirrors 260 is placed in a position corresponding to the plurality of secondary light sources 164. That is, the second array 26 is placed so that the first array 16 and the reference planes 163 and 263 are parallel to each other and that the ray exiting from the center 162 of the first array 16 is incident on the center 262 of the second array 26.

The reflection mirrors 260 constituting the second array 26 also comprise concave reflecting mirrors of a decentered configuration with the optical axes 261 tilting with respect to the reference surface 263. The decentering angle is set so that the ray exiting from the center 162 of the first array 16 and incident on the center 262 of the second array 26 exits vertically to the reference plane 263 of the second array 26.

The surface 4 to be illuminated is placed parallel to the reference plane 263 of the second array 26 so that the ray exiting from the center 162 of the first array 16 to be directed to the center 262 of the second array 26 and exiting from the center 262 is vertically incident on the center 41 of the surface 4. The reflection mirrors 260 of the second array 26 are formed so that the luminous fluxes from the secondary light sources 164 formed in the reflection mirrors 260 of the second array 26 are each applied to the entire surface of the surface 4. Since the plurality of luminous fluxes divided by the first array 16 are thus superposed on the surface 4, uniform illumination of the surface 4 is realized.

According to this embodiment, since the optical path is bent by reflecting the light at both the first array 16 and at the second array 26, a more compact two-dimensional illumination optical system is realized.

The optical path lengths from the light source unit 3 to the first array 16, from the first array 16 to the second array 26 and from the second array 26 to the surface 4 are substantially the same among the luminous fluxes from the mirrors 160 constituting the first array 16. Consequently, the reflection mirrors 160 and 260 constituting the first array 16 and the second array 26 can have substantially the same optical power, so that these elements are easy to design and manufacture.

Since the first array 16 and the second array 26 are both formed as reflection arrays, the astigmatism due to oblique incidence can be corrected by both of the two arrays 16 and 26, so that the astigmatism is more effectively corrected.

Since the ray emitted from the center 31 of the light source unit 3 is vertically incident on the first array 16 and the ray exiting from the center 262 of the second array 26 is also vertically incident on the surface 4 to be illuminated, uniform illumination with little distortion is realized.

Figure 9:
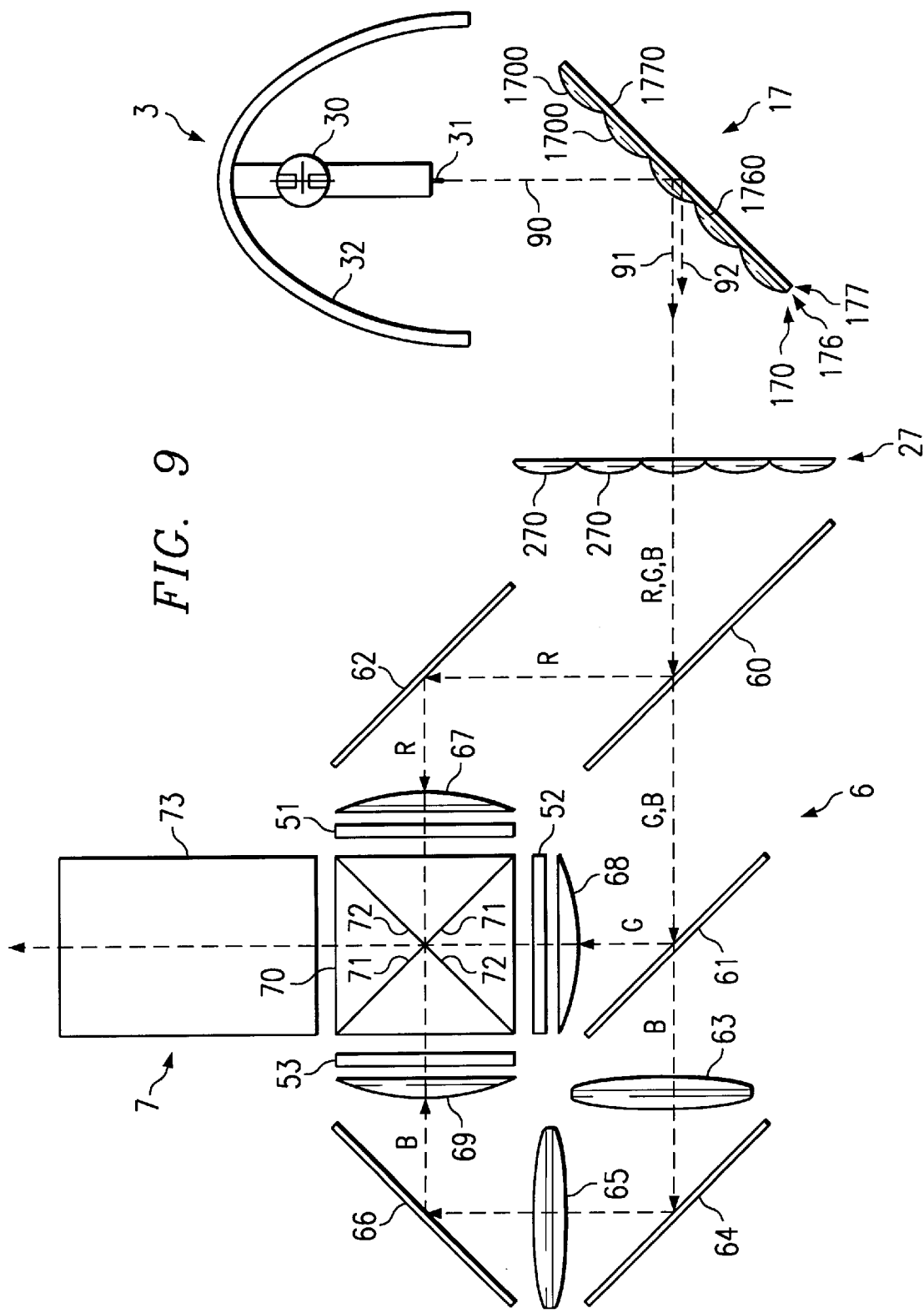
FIG. 9 is a structural view showing an embodiment of a liquid crystal projector according to the present invention.

FIG. 9 is a structural view showing an embodiment of a liquid crystal projector employing the two-dimensional illumination optical system according to the present invention. This liquid crystal projector has three liquid crystal panels 51 to 53 for forming desired optical images, a two-dimensional illumination optical system for generating visible rays with a uniform polarization direction, a color separation optical system 6 for separating the visible rays from the two-dimensional illumination optical system into rays of three primary colors and applying the rays to the liquid crystal panels 51 to 53 corresponding thereto, and a projection optical system 7 for projecting the images formed on the liquid crystal panels 51 to 53 onto a screen by directing the color component rays from the liquid crystal panels 51 to 53 onto the screen while situating the optical axis. The structures of these elements will be described.

The two-dimensional illumination optical system comprises: the light source unit 30 including the light source 30 comprising a metal halide lamp, and the parabolic mirror 32; a first array 17 formed as a reflection array; and a second array 27 formed as a transmission array.

The parabolic mirror 32 in which the light source 30 is provided in one focal position is disposed with the opening side being on the lower side of the figure. The luminous flux of random polarization from the light source 30 exits through the opening directly, and together with the light reflected at the parabolic mirror, as a substantially parallel beam. On the opening side, the first array 17 is placed so as to slightly tilt with respect to the direction of the light from the light source unit 3. Consequently, the light from the light source unit 3 is obliquely incident on the first array 17.

Figure 10:
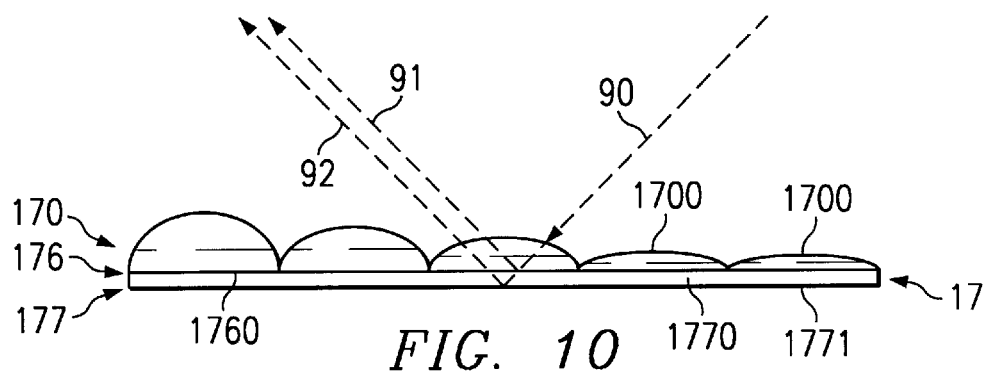
FIG. 10 is a structural view of a reflection array having a polarization separation part and a polarization direction conversion part.

The first array 17 comprises a lens part 170, a polarization separation part 176 and a polarization direction conversion part 177. The first array 17 divides the luminous flux from the light source unit 3 into a plurality of luminous fluxes, and applies them to the second array 27 after making their polarization directions uniform. The structure of the first array 17 will be described with reference to FIG. 10.

In the lens part 170, a plurality of plano-convex lenses 1700 one surfaces of which are plane and the other surfaces of which are convex are arranged so that their rims adjoin each other. The convex surfaces of the plano-convex lenses 1700 serve as the incidence surface and the exit surface of the first array 17. Since the optical path lengths from the plano-convex lenses 1700 constituting the lens part 170 to the second array 27 are different as shown in FIG. 9, the plano-convex lenses 1700 are provided with different optical powers in accordance with the optical path length difference.

On one surface of the lens part 170 that is formed as a plane surface, a polarization separation film 1760 is formed as a multilayer film. The film 1760 serves as the polarization separation part 176 for separating the incident light into bi-directional linearly polarized components whose polarization directions are perpendicular to each other. Consequently, light 90 of random polarization incident on the first array 17 is separated into two components by a first linearly polarized component (S component) being reflected at the polarization separation film 1760 and a second linearly polarized component (P component) passing through the polarization separation film 1760.

To the polarization separation film 1760, a quarter-wave plate 1770 is bonded serving as the polarization direction conversion part 177 for converting the polarization direction of the incident light. The luminous flux 92 of the P component transmitted by the polarization separation film 1760 is incident on the quarter-wave plate 1770 and is totally reflected at a non-bonded surface 1771 of the quarter-wave plate 1770 to be returned toward the polarization separation film 1760. Since the luminous flux 92 of the P component passes through the quarter-wave plate 1770 twice in different directions, the quarter-wave plate 1770 acts as a half-wave plate, so that the luminous flux 92 of the P component taking this optical path has its polarization direction converted into that of the S component. The luminous flux 92 having its polarization direction converted into that of the S component again passes through the plano-convex lens 1700 together with a luminous flux 91 of the S component reflected at the polarization separation film 1760, and exits from the first array 17. Consequently, all of the luminous fluxes exiting from the first array 17 have their polarization directions converted into that of the S component.

Figure 11:
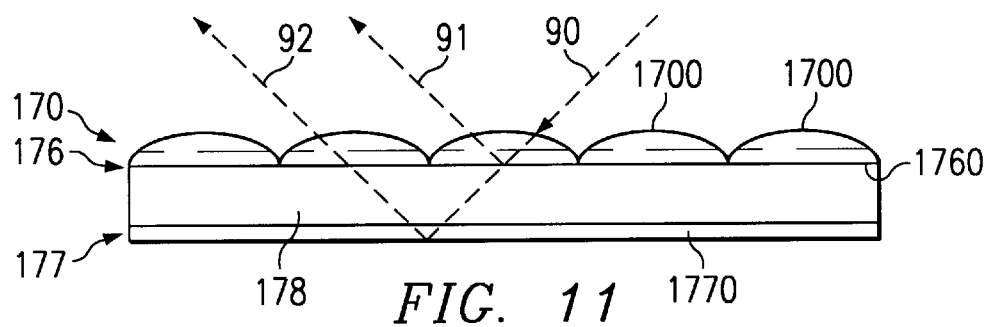
FIG. 11 is a structural view of a reflection array having the polarization separation part and the polarization direction conversion part.
Figure 12:
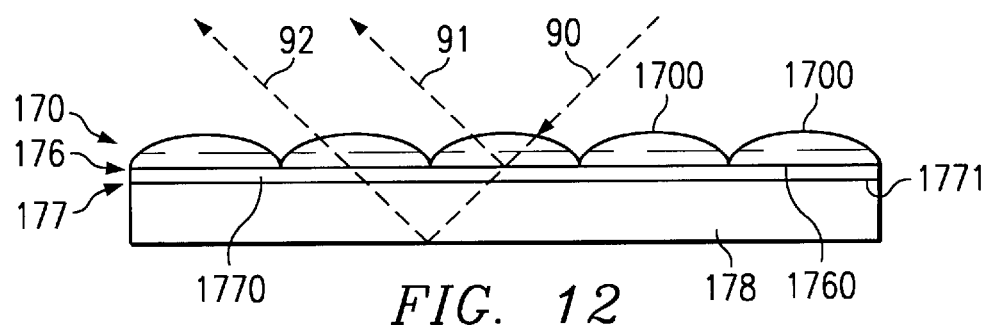
FIG. 12 is a structural view of a reflection array having the polarization separation part and the polarization direction conversion part.

While in this embodiment, only the quarter-wave plate 1770 performing polarization conversion is directly attached to the polarization separation film 1760 formed on one surface of the lens part 170, a parallel plate 178 made of optical glass may be provided between the polarization separation film 1760 and the quarter-wave plate 1770 as shown in FIG. 11, or the parallel plate 178 may be provided on the surface 1771 of the quarter-wave plate 1770 as shown in FIG. 12, or the parallel plate 178 may be provided on both surfaces of the quarter-wave plate 1770. By providing the parallel plane 178, the position can be shifted where the luminous flux of the P component transmitted by the polarization separation film 1760 and reflected at a totally reflecting surface 175 is again incident on the lens part 170, so that an arrangement can be realized in which the light incident on the array 17 is incident on and exits from different plano-convex lenses 1700.

Reverting to FIG. 9, the second array 27 comprising a plurality of two-dimensionally arranged transmission lenses 270 are disposed in the vicinity of the focal position of the lenses 1700 of the first array 17. The luminous fluxes 91 and 92 from the first array 17 having undergone polarization direction conversion into the polarization direction of the S component in the first array 17 are incident on the second array 27. The number of the lenses 270 of the second array 27 is the same as that of the lenses 1700 of the first array 17 in correspondence with the number of luminous fluxes divided by the first array 17. The transmission lenses 270 constituting the second array 27 are formed so that the plurality of incident luminous fluxes 91 and 92 are each applied to the entire surfaces of the surfaces to be illuminated, namely the liquid crystal panels 51 to 53.

In the two-dimensional illumination optical system thus structured, the first array 17 divides the light 90 from the light source unit 3 into a plurality of luminous fluxes and the plurality of luminous fluxes are each applied to the entire surfaces of the surfaces to be illuminated, namely the liquid crystal panels 51 to 53. Consequently, the liquid crystal panels 51 to 53 are uniformly illuminated and illumination light with a uniform polarization direction can be provided by making uniform the polarization directions of the luminous fluxes used for the illumination by the first array 17 having the polarization separation part 176 and the polarization direction converting part 177.

Since size reduction is achieved by bending the optical path from the light source unit 3 to the second array 27 by using a reflection array as the first array 17, the two-dimensional illumination optical system can be disposed in a small space.

While the two-dimensional illumination optical system having been described here is for use in liquid crystal projectors, it is applicable as a two-dimensional illumination optical system for use in various types of optical apparatuses that provide illumination light having a predetermined uniform polarization direction.

The liquid crystal panels 51 to 53 illuminated by the two-dimensional illumination optical system are transmission liquid crystal panels. The liquid crystal panel 51 forms optical images of R of RGB. The liquid crystal panel 52 forms optical images of G of RGB. The liquid crystal panel 53 forms optical images of B of RGB.

In order to illuminate these three liquid crystal panels 51 to 53 with corresponding primary color rays, the color separation optical system 6 for separating the luminous flux from the two-dimensional illumination optical system into rays of three primary colors comprises a dichroic filter 60 reflecting the luminous fluxes of the wavelength band of R and transmitting the luminous fluxes of the wavelength bands of G and B, and a dichroic filter 61 reflecting the luminous fluxes of the wavelength band of G and transmitting the luminous fluxes of the wavelength band of B.

Of the luminous fluxes exiting from the two-dimensional illumination optical system, the luminous flux of the wavelength band of R is reflected at the dichroic filter 60 and at a totally reflecting mirror 62, passes through a field lens 67 and is applied to the liquid crystal panel 51 for R parallel to the optical axis to illuminate the liquid crystal panel 51. The luminous flux of the wavelength band of G is transmitted by the dichroic filter 60, is reflected at the dichroic filter 61, passes through a field lens 68 and is applied to the liquid crystal panel 52 for G parallel to the optical axis to illuminate the liquid crystal panel 52. The luminous flux of the wavelength band of B is transmitted by both the two dichroic filters 60 and 61, passes through a lens 63, a totally reflecting mirror 64, a lens 65, a totally reflecting mirror 66 and a field lens 69, and is applied to the liquid crystal panel 53 for B parallel to the optical axis to illuminate the liquid crystal panel 53.

In a dichroic prism 70, four right-angle prisms are bonded so as to form a cube or a rectangular parallelepiped. On the bonded surfaces thereof, a dichroic mirror 71 and a dichroic mirror 72 are formed as multilayer films. The dichroic mirror 71 reflects the luminous fluxes of the wavelength band of R and transmits the luminous fluxes of the wavelength bands of G and B. The dichroic mirror 72 reflects the luminous fluxes of the wavelength band of B and transmits the luminous fluxes of the wavelength bands of R and G. The dichroic prism 70 superposes the optical images of R, G and B formed by the three liquid crystal panels 51 to 53.

A projection lens 73 serves as the projection optical system 7 for projecting the color optical image formed by the superposition by the dichroic prism 70 on the screen so as to be enlarged.

As described above, this liquid crystal projector is compact in size because the two-dimensional illumination optical system is used having the first array 17 formed as a reflection array.

Since the first array 17 has the polarization separation part 176 and the polarization direction conversion part 177, light with a uniform polarization direction exits from the two-dimensional illumination optical system, so that the liquid crystal panels 51 to 63 are brightly illuminated. As a result, the quantity of the light exiting from the liquid crystal panels 51 to 53 is increased to enhance the brightness of the image projected onto the screen.

While the present invention has been described by use of the embodiments, it is not limited to the above-described embodiments but may be arranged as described below.

Figure 13:
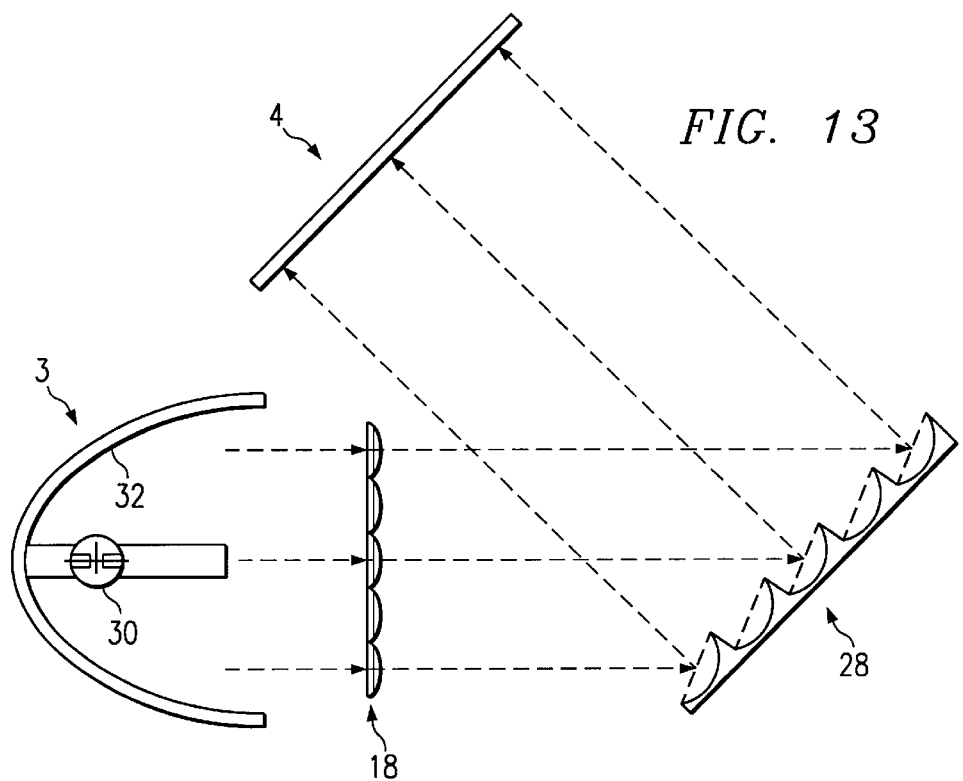
FIG. 13 is a structural view showing another embodiment of the two-dimensional illumination optical system according to the present invention.
Figure 14:
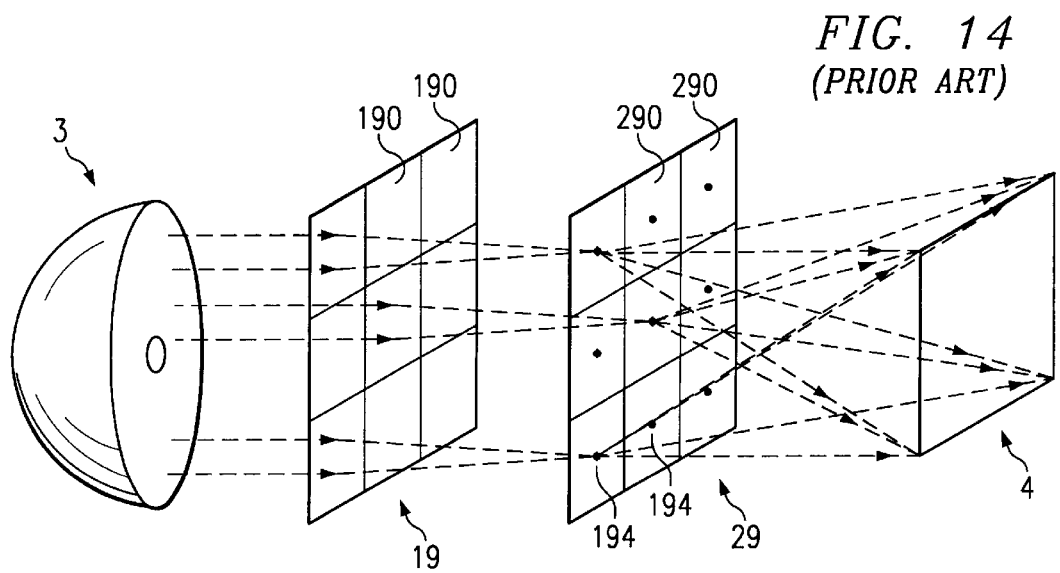
FIG. 14 shows the conventional two-dimensional illumination optical system using two transmission arrays.

(1) In the two-dimensional illumination optical system according to the above-described embodiments, only the first array is formed as a reflection array (the first embodiment, and the embodiment for use in liquid crystal projectors) or both the first array and the second array are formed as reflection arrays (the second embodiment). However, the types of the first and the second arrays may be such that, as shown in FIG. 13, a first array 18 is a transmission array and a second array 28 is a reflection array. With this arrangement, size reduction of the two-dimensional illumination optical system is also achieved by bending the optical path without the use of another optical element such as a plane mirror.

(2) In the above-described embodiments, the reflection array is placed so that the optical axes of the lenses constituting the reflection array are tilted (decentered) with respect to the reference plane of the array in order that the light incident on the reflection array exits at a given angle irrespective of the angle of placement of the reference plane of the reflection array. However, the lenses are not necessarily decentered. When the lenses are not decentered, the incidence angle and the exit angle (reflection angle) of the luminous flux to the reference plane of the array coincide with each other and the reflection array is placed at an angle in accordance with the incidence and exit angles. In this case, however, since the aberration correction by decentering the lenses cannot be performed, it is desired to use other means to correct aberration.

(3) It is desired that the lenses of the reflection array be free curved surface lenses having non-axisymmetric optical power. With this arrangement, ray aberrations due to oblique reflection are corrected, so that illumination uniformity further improves.

(4) When the first array formed as a reflection array has the polarization separation part and the polarization direction conversion part, two luminous fluxes, namely a luminous flux of a first polarization direction and a luminous flux of which polarization direction has been converted from a second polarization direction to the first polarization direction exit from each of the lenses constituting the first array. In the above-described embodiments, the two luminous fluxes exiting from one lens of the first array are made incident on one lens of the second array. However, the present invention is not limited thereto but an arrangement may be employed in which the second array has twice as many lenses as the first array and the two luminous fluxes exiting from each of the lenses constituting the first array are made incident on different lenses of the second array so that the luminous fluxes exiting two from each lens of the first array are in one-to-one correspondence with the lenses constituting the second array.

(5) While in the above-described embodiments, the first array is formed as a reflection array having the polarization separation part and the polarization direction conversion part, the second array may be formed as a array having the polarization separation part and the polarization direction conversion part.

As described above, according to the present invention, since at least one of the first array and the second array is a reflection array, the optical path from the light source unit to the surface to be illuminated is bent by the reflection array. As a result, size reduction of a two-dimensional illumination optical system capable of uniform illumination is achieved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An illumination optical system comprising:
    a light source unit:
        a first array having a plurality of two-dimensionally arranged cells which deflect an incident light from the light source unit; and
        a second array having a plurality of two-dimensionally arranged cells which deflect a light from the first array, the second array being arranged in a vicinity of a focal plane of the first array,
    wherein at least one of the first array and the second array is formed as a reflection array.

2. An illumination optical system as claimed in claim 1, wherein the first array is formed as a reflection array.

3. An illumination optical system as claimed in claim 1, wherein the second array is formed as a reflection array.

4. An illumination optical system as claimed in claim 1, wherein both the first and second arrays are formed as reflection arrays.

5. An illumination optical system as claimed in claim 1, wherein the reflection array is provided with a decentered configuration.

6. An illumination optical system as claimed in claim 1, wherein the reflection array has a plurality of concave reflecting mirrors.

7. An illumination optical system as claimed in claim 1, wherein the reflection array has a plurality of plano-convex lenses which are arranged on a substrate having a plane surfaces oblique to a reference surface of reflection array.

8. An illumination optical system as claimed in claim 1, wherein the reflection array has a plurality of bi-convex lenses which are arranged on a substrate having a lens configuration.

9. A projector comprising:
    an illumination optical system;
    a color separation optical system for separating the visible rays from the illumination optical system into rays of three primary colors:
        liquid crystal panels to which rays corresponding thereto are applied, the crystal panels forming images; and
        a projection optical system for projecting images formed on the liquid crystal panels onto a screen by directing the color component rays from the liquid crystal panels onto the screen
    the illumination optical system comprising:
        a light source unit;
        a first array having a plurality of two-dimensionally arranged cells which deflect an incident light from the light source unit; and a second array having a plurality of two dimensionally arranged cells which deflect a light from the first array, the second array being arranged in a vicinity of a focal plane of the first array, wherein at least one of the first array and the second array is formed as a reflection array.

10. A projector as claimed in claim 9, wherein the reflection array is provided with a decentered configuration.

11. A projector as claimed in claim 9, wherein the reflection array has a plurality of concave reflecting mirrors.

12. A projector as claimed in claim 9, wherein the reflection array has a plurality of plano-convex lenses which are arranged on a substrate having a plane surfaces oblique to a reference surface of reflection array.

13. A projector as claimed in claim 9, wherein the reflection array has a plurality of bi-convex lenses which are arranged on a substrate having a lens configuration.

14. A projector as claimed in claim 9, wherein the reflecting array has a plane surface and a polarization separation film formed as a multilayer film separating the incident light into bi-directional linearly polarized components whose polarization directions are perpendicular to each other.

* * * * *

UNITED STATES PATENT AND TRADEMARK OFFICE
CERTIFICATE OF CORRECTION

PATENT NO. : 5,993,010
DATED : November 30, 1999
INVENTOR(S) : Soh OHZAWA et al.

It is certified that error appears in the above-identified patent and that said Letters Patent is hereby corrected as shown below:

Column 2, line 14, delete "accompanies", and insert --accompanying--.

Column 5, line 24, after "3 and 3'", insert --(FIG. 2(a))--.

Column 6, line 47, delete "light source unit 2", and insert --light source unit 3--.

Column 7, line 27, delete "mirriors", and insert --mirrors--.

Column 8, line 31, delete "unit 30", and insert --unit 3--.

Column 9, line 42, delete "175", and insert --1771--.

Column 12, claim 7, line 46, delete "of reflection array", and
  insert --of the reflection array--.

Column 13, claim 9, line 1, delete "two dimensionally", and
  insert --two-dimensionally--.

Column 14, claim 12, line 2, delete "of reflection array", and
  insert --of the reflection array--.

Signed and Sealed this

Tenth Day of April, 2001

Attest:

NICHOLAS P. GODICI

Attesting Officer       Acting Director of the United States Patent and Trademark Office